United States Patent [19]

Arai et al.

[11] Patent Number: 4,459,390
[45] Date of Patent: Jul. 10, 1984

[54] METHOD OF MAKING AND POLYMER OF HEAT RESISTANT POLYESTER USING DIGLYCIDILARYLIMIDAZOLONES, AND DIGLYCIDILALKYL UREAS

[75] Inventors: Yoshihiro Arai, Joyo; Takumi Tanaka, Uji, both of Japan

[73] Assignee: Unitika Limited, Osaka, Japan

[21] Appl. No.: 540,255

[22] Filed: Oct. 11, 1983

[30] Foreign Application Priority Data

Feb. 16, 1983 [JP] Japan .................... 58-25247

[51] Int. Cl.$^3$ .............................................. C08G 63/76
[52] U.S. Cl. .................... 525/438; 528/288; 528/289; 528/297
[58] Field of Search .............. 528/288, 289, 297; 525/438

[56] References Cited

U.S. PATENT DOCUMENTS 4,130,601 12/1978 Ohoka et al. ...................... 525/438
4,139,521  2/1979 Lazarus et al. .................. 528/289 X
4,196,066  4/1980 Inata et al. ..................... 528/289 X
4,269,947  5/1981 Inata et al. ..................... 525/438 X
4,351,936  9/1982 Matsumura et al. ............... 528/288 X

*Primary Examiner*—Lucille M. Phynes
*Attorney, Agent, or Firm*—Richard A. Anderson

[57] ABSTRACT

This invention is a polymer and a method of making heat resistant polyester which is characterized by reacting the polyester which consists of aromatic dicarboxylic acid and glycol with 2-6 carbons, with 0.1-5 weight % of the bifunctional epoxy compound which has one carbonyl group adjacent to the nitrogen atom and is expressed by the general formula

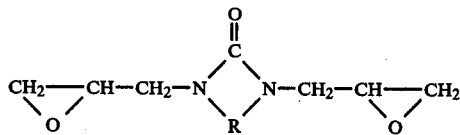

(R is a divalent organic group) to keep the amount of end carboxyl group below 15 g equivalent/$10^6$ g polymer.

5 Claims, No Drawings

METHOD OF MAKING AND POLYMER OF HEAT RESISTANT POLYESTER USING DIGLYCIDILARYLIMIDAZOLONES, AND DIGLYCIDILALKYL UREAS

BACKGROUND OF THE INVENTION

This invention is related to a method of making the heat resistant polyester which has reduced amount of end carboxyl groups.

In order to improve the heat stability of polyester, i.e., the resistance to hydrolysis and to aminolysis at high temperature, reduction of the amount of end carboxyl groups (hereinafter this will be written as (COOH)) is well known to be an effective method. Many methods of reducing the (COOH) of polyester have been proposed. Among them, the method of reacting the polyester with an epoxy compound is known as a typical example. Study of this method shows that, by the addition of an epoxy compound, the (COOH) decreases, but there arise the problems such as the reduction in degree of polymerization and the insufficient reactivity of (COOH) in some epoxy compounds with which the effect is not sufficient.

SUMMARY OF THE INVENTION

In order to solve this problem, it has been found that it is effective to react with the bifunctional epoxy compound which has one carbonyl group adjacent to the nitrogen atom and is expressed by the general formula

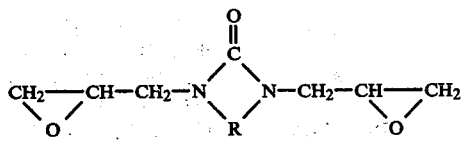

(A)

(R is a divalent organic group).

This invention is the method of making heat resistant polyester which is characterized by reacting the polyester which consists of aromatic dicarboxylic acid and the glycol component with 2–6 carbons, with 0.1–5 weight % of the bifunctional epoxy compound which is expressed by the above general formula (A) to keep the (COOH) below 15 g equivalent/$10^6$ g polymer.

In this invention, polyester means the polycondensation product of aromatic dicarboxylic acid and glycol with 2–6 carbons; however, there is no restriction as to the type. It can be either the homopolymer or copolymer. As for the method of polycondensation of polyester, one can use the conventional methods without modification.

As the specific examples of the bifunctional epoxy compound which is expressed by the above shown general formula (A), one can raise the following:
N,N'-diglycidil-benzimidazolone;
N,N'-diglycidil-5-acetylbenzimidazolone;
N,N'-diglycidil-5,6-dimethylbenzimidazolone;
N,N'-diglycidil-5-chlorobenzimidazolone;
N,N'-diglycidil-5-nitrobenzimidazolone;
N,N'-diglycidil-5,6-dichlorobenzimidazolone;
N,N'-diglycidil-5-methoxybenzimidazolone;
N,N'-diglycidil-5-caprylbenzimidazolone;
N,N'-diglycidilethyleneurea;
N,N'-diglycidil-4-methylethyleneurea;
N,N'-diglycidil-4-chloroethyleneurea;
N,N'-diglycidil-4-acetylethyleneurea;
N,N'-diglycidil-2-imidazolone;
N,N'-diglycidil-4-phenyl-2-imidazolone;
N,N'-diglycidil-4-acetyl-2-imidazolone;
N,N'-diglycidil-4-methyl-2-imidazolone; and
N,N'-diglycidil-4-chloro-2-imidazolone.

In the above shown general formula (A), those in which R is phenylene group, ethylene group or vinylene (including those containing substitution group) are suitable.

These compounds can be synthesized by starting from the compounds in which there is —NH group in place of the N-glycidil group and by substituting the hydrogen atom on the nitrogen atom with glycidil group.

In other words, to the NH group of the starting material, epihalohydrin, particularly epichlorohydrin or epibromohydrin, is reacted to introduce the glycidil group directly. This reaction can be carried out well with the presence of a small amount of a quaternary ammonium compound as the catalyst (France Pat. No. 1 559 450).

Such bifunctional epoxy compound can be used in single or in combination of two or more.

The amount of addition of the compound expressed by the above general formula (A) which is used in this invention is 0.1–5 weight % with respect to the polyester. If the amount is too small, degree of blocking the (COOH) is low; reversely, if the amount is too much, there arise problems such as the gelation of polyester which makes the melt spinning impossible, although the reaction proceeds sufficiently.

The reaction of polyester and the compound of the above shown general formula (A) can be carried out by adding the compound which is expressed by the above general formula (A) at the stage where the intrinsic viscosity of polyester reached 0.5; the reaction takes more than 3 minutes at the temperature above the melting temperature of polyester. The intrinsic viscosity refers to the one which is measured at 20° C. by use of the mixed solvent of phenol/tetrachloroethane (1/1 weight ratio). At the time of reaction, it is naturally necessary that the atmosphere is filled with an inert gas such as nitrogen or the active gas which accelerates the decomposition of polyester is blocked by other means; furthermore, the reaction should be carried out under stirring. The compound which is expressed by the above general formula (A) can be added and mixed before the completion of the polycondensation of polyester; however, one can also use the methods such as adding and mixing to the molten polyester after the completion of polymerization and before the melt spinning or the method of mixing with the pulverized solid polyester and then melt spinning to let it react. The reaction occurs without a catalyst, but one can also use a desirable catalyst.

With the addition of the compound which is expressed by the above general formula (A), (COOH) of polyester is effectively reduced; as the compound given by the above general formula (A) is bifunctional, addition of this compound does not cause the reduction in the degree of polymerization of the polymer; rather, it brings a favorable result of the increase in the degree of polymerization by the linking of polyester molecular chains.

In this way, one can achieve the improvement of heat resistance by reacting the polyester with 0.5–5 weight % of the compound given by the above general formula (A) to reduce (COOH) below 15 g equivalent per $10^6$ g of polymer.

In obtaining the polyester of this invention, it is of course possible to add other additives for other purposes.

The final form of polyester in this invention can be fiber, film and any other form.

The polyester with reduced (COOH) which is obtained in this invention has a very much improved heat resistance, i.e., the resistance to hydrolysis or aminolysis at high temperature. This improves the practical value by a great deal with the enhanced improvement in the conventional applications, rationalization of the processes, and new application to the areas where application could not be made in the past.

In the following, the invention is explained in further detail by the use of examples of application.

EXAMPLES AND COMPARATIVE EXAMPLES

Polyethylene chips with intrinsic viscosity of 0.73 and (COOH) of 24 g equivalents/$10^6$ g polymer obtained by the common method from terephthalic acid and ethylene glycol. To this, epoxy compound was added by the amount shown in Table 1 and blended. Then, this was spun by use of a spinnerette die having 192 holes with a hole diameter of 0.5 mm. Spinning conditions were: temperature, 300° C.; residence time, 3–12 minutes; throughput, 300 g/min.; wind up speed, 317 m/min. The yarn obtained was 8520 d/192 f. The undrawn yarn obtained was drawn to a ratio of 3.8 at 90° C. in the first stage, and to a ratio of 1.5 at 200° C. at the second stage. Then the yarn was heat treated at 200° C. under tension and finally the drawn yarn of 1500 d/192 f was obtained. With the drawn yarn, first the Z twist of 40 T/10 cm was given; then, after joining 2 strands, the S twist of 40 T/10 cm was given to obtain the griege cord of 1500 d×2. This greige cord was dipped into one-bath type adhesion solution (Pexul (product of ICI Company)-RFL solution); after applying a tension of 1.0 kg/cord, heat space treatment was carried out at 240° C. for 3 minutes to make the treated cord. Next, in order to examine the heat resistance of the treated cord, the heat resistant strength was measured with the samples which were prepared under the vulcanization conditions of 170° C., 100 kg/cm$^2$, 60 minutes. Next, the adhesive force of the treated cord was evaluated by the H-test. First, the test piece was prepared by the vulcanization adhesion at 150° C., 100 kg/cm$^2$, 30 minutes, and then the adhesive force was measured. Properties of the drawn yarn and treated cord are shown in Table 1.

The epoxy compounds of Example 1–4 were synthesized by reacting benzimidazolone, 5-acetylbenzimidazolone, ethylene urea, 2-imidazolone and epichlorohydrin with small amount of tetraethyl ammonium bromide as the catalyst.

N,N'-diglycidil-benzimidazoline has a melting point of 120° C.; N,N'-diglycidil-5-acetylbenzimidazolone has a melting point of 127° C.; N,N'diglycidil-ethylene urea and N,N'-diglycidil-2-imidazolone are colorless syrup type substances.

In the Comparative Example 5, Denacol EX-221 is a trade name of dibromoeopentylglycoldiglycidil ether (Nagase Sangyosha).

From Table 1, it is seen that, according to the Examples 1–4 which satisfy the requirements of this invention, addition of the epoxy compound reduced (COOH), increased the intrinsic viscosity, improved the heat resistant strength and heat resistant strength retention and improved the adhesion force as well.

When the amount of addition of the epoxy compound was too small (Comparative Example 2), the effect was not sufficient; when it was too much (Comparative Example 3), polyester gelled and the pressure in the extruder was abnormally high, making it impossible to spin.

Comparative Examples 4, 5 indicate the known examples. In Comparative Example 4, a monofunctional epoxy compound was used and in Comparative Example 5, a bifunctional epoxy compound was used. In each case, addition of the epoxy compound caused the reduction in intrinsic viscosity. In Comparative Example 5, the reactivity of the epoxy compound and the (COOH) of polyester was lacking and the effect of reducing (COOH) was not observed.

TABLE 1

| Example Number | Epoxy Compounds | | Drawn Yarn | | Treated Cord | | | |
|---|---|---|---|---|---|---|---|---|
| | Name of Compound | Amt. of Addition, Weight % | Intrinsic Viscosity | (COOH) Grams Equivalent/ $10^6$ Grams | Strength, kg | Heat Resistant Strength, kg | Strength Retention, % | Adhesive Force, kg |
| 1 | N,N'diglycidil-benzimidaolone | 0.5 | 0.92 | 6 | 23.2 | 19.5 | 84 | 20.5 |
| 2 | N,N'—diglycidil-5-acetyl-benzimidalone | 0.5 | 0.89 | 8 | 22.6 | 18.7 | 83 | 20.1 |
| 3 | N,N'—diglycidil-2-ethylene urea | 0.5 | 0.90 | 7 | 23.0 | 19.3 | 84 | 20.4 |
| 4 | N,N'—diglycidil-2-imidazolone | 0.5 | 0.88 | 9 | 22.2 | 18.2 | 82 | 19.9 |
| Comparative Example 1 | — | — | 0.70 | 29 | 18.4 | 11.0 | 60 | 15.2 |
| Comparative Example 2 | N,N'—diglycidil-benzimidazolone diimide | 0.05 | 0.74 | 18 | 18.8 | 13.2 | 70 | 15.8 |
| Comparative Example 3 | N,N'—diglycidil-benzimidazolone | 6.0 | Spinning impossible | | — | — | — | — |
| Comparative Example 4 | N—glycidilphthalimide | 0.5 | 0.68 | 6 | 17.5 | 12.2 | 70 | 15.4 |
| Comparative Example 5 | Denacol EX-221 | 0.5 | 0.67 | 26 | 17.1 | 10.5 | 61 | 14.2 |

We claim:

1. A method of making heat resistant polyester which consists of reacting an aromatic dicarboxylic acid with a glycol with 2 to 6 carbons, and reacting said polyester with 0.1 to 5 weight % of a bifunctional epoxy compound which has one carbonyl group adjacent to the nitrogen atom and is expressed by the general formula

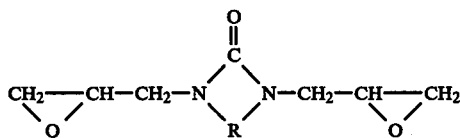

(A)

wherein R is a divalent organic group to keep the amount of end carboxyl groups below 15 g equivalent/$10^6$ g polymer.

2. The method of claim 1 wherein (A) is selected from the group consisting of
N,N'-diglycidil-benzimidazolone;
N,N'-diglycidil-5-acetylbenzimidazolone;
N,N'-diglycidil-5,6-dimethylbenzimidazolone;
N,N'-diglycidil-5-chlorobenzimidazolone;
N,N'-diglycidil-5-nitrobenzimidazolone;
N,N'-diglycidil-5,6-dichlorobenzimidazolone;
N,N'-diglycidil-5-methoxybenzimidazolone;
N,N'-diglycidil-5-caprylbenzimidazolone;
N,N'-diglycidilethyleneurea;
N,N'-diglycidil-4-methylethyleneurea;
N,N'-diglycidil-4-chloroethyleneurea;
N,N'-diglycidil-4-acetylethyleneurea;
N,N'-diglycidil-2-imidazolone;
N,N'-diglycidil-4-phenyl-2-imidazolone;
N,N'-diglycidil-4-acetyl-2-imidazolone;
N,N'-diglycidil-4-methyl-2-imidazolone; and
N,N'-diglycidil-4-chloro-2-imidazolone.

3. The method of claim 1 wherein the intrinsic viscosity of said polyester is above 0.5 and the resulting reaction takes more than 3 minutes.

4. A heat resistant polyester polymer comprising the reaction product of an aromatic dicarboxylic acid with a glycol with 2 to 6 carbons, and further reacted with 0.1 to 5 weight % of a bifunctional epoxy compound which has one carbonyl group adjacent to the nitrogen atom and is expressed by the general formula

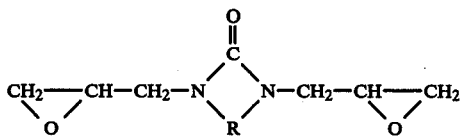

(A)

wherein R is a divalent organic group, to keep the amount of end carboxyl groups of said reacted polyester below 15 g equivalent/$10^6$ g polymer.

5. The polymer of claim 1 wherein (A) is selected from the group consisting of
N,N'-diglycidil-benzimidazolone;
N,N'-diglycidil-5-acetylbenzimidazolone;
N,N'-diglycidil-5,6-dimethylbenzimidazolone;
N,N'-diglycidil-5-chlorobenzimidazolone;
N,N'-diglycidil-5-nitrobenzimidazolone;
N,N'-diglycidil-5,6-dichlorobenzimidazolone;
N,N'-diglycidil-5-methoxybenzimidazolone;
N,N'-diglycidil-5-caprylbenzimidazolone;
N,N'-diglycidilethyleneurea;
N,N'-diglycidil-4-methylethyleneurea;
N,N'-diglycidil-4-chloroethyleneurea;
N,N'-diglycidil-4-acetylethyleneurea;
N,N'-diglycidil-2-imidazolone;
N,N'-diglycidil-4-phenyl-2-imidazolone;
N,N'-diglycidil-4-acetyl-2-imidazolone;
N,N'-diglycidil-4-methyl-2-imidazolone; and
N,N'-diglycidil-4-chloro-2-imidazolone.

* * * * *